(No Model.) 2 Sheets—Sheet 1.
A. J. BAUGH.
FERTILIZER DISTRIBUTER.
No. 385,990. Patented July 10, 1888.
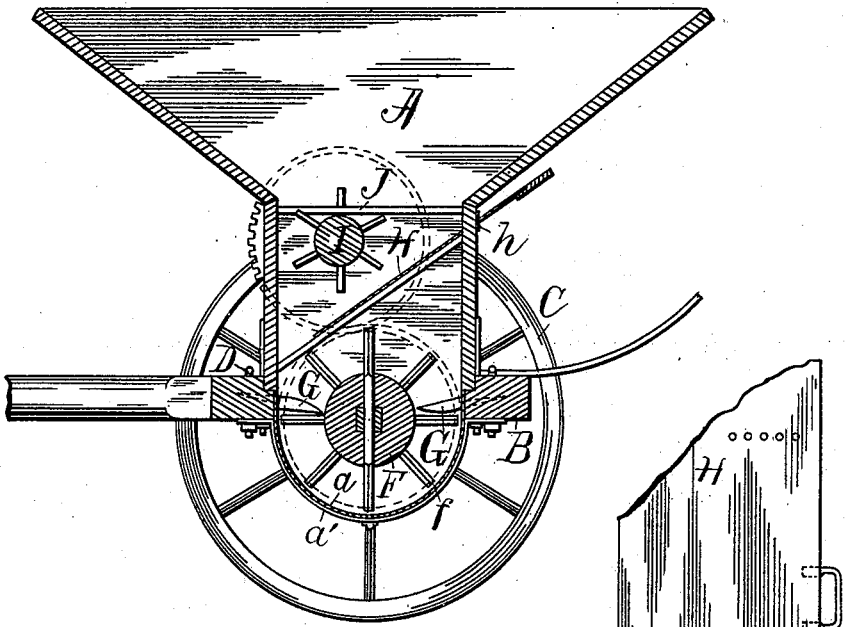
Fig. 1.
Fig. 2.
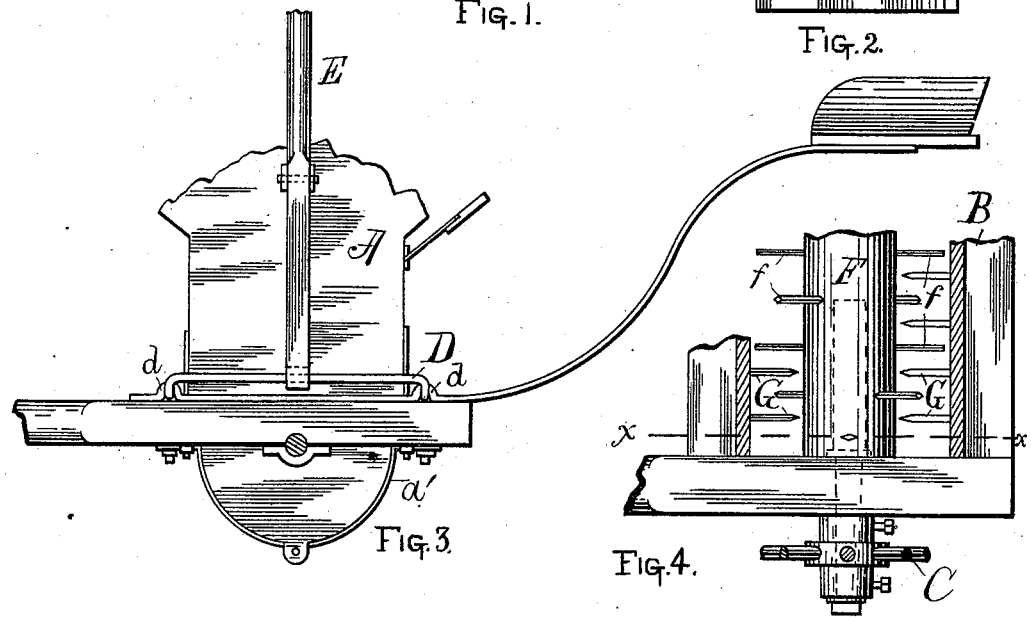
Fig. 3.
Fig. 4.
Witnesses,
L. P. Hayden.
A. P. Wood.
Inventor.
ANDREW J. BAUGH.
By his Attorney
Albert P. Wood.

(No Model.)  
2 Sheets—Sheet 2.

A. J. BAUGH.
FERTILIZER DISTRIBUTER.

No. 385,990. Patented July 10, 1888.

Witnesses.  
L. F. Hayden.  
A. P. Wood.

Inventor.  
ANDREW J. BAUGH  
By his Attorney  
Albert A. Wood.

United States Patent Office.

ANDREW J. BAUGH, OF JONESBOROUGH, GEORGIA.

FERTILIZER-DISTRIBUTER.

SPECIFICATION forming part of Letters Patent No. 385,990, dated July 10, 1888.

Application filed December 19, 1887. Serial No. 258,410. (No model.)

*To all whom it may concern:*

Be it known that I, ANDREW J. BAUGH, a citizen of the United States, residing at Jonesborough, in the county of Clayton and State of Georgia, have invented a new and useful Fertilizer-Distributer; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in devices for distributing fertilizers of all kinds in drills and in any required quantity.

It consists, therefore, of means whereby the fertilizer is ground or pulverized, and in mechanism for promoting and regulating the discharge from the machine, the details of all of which will be hereinafter fully set forth and claimed.

Figure 5:
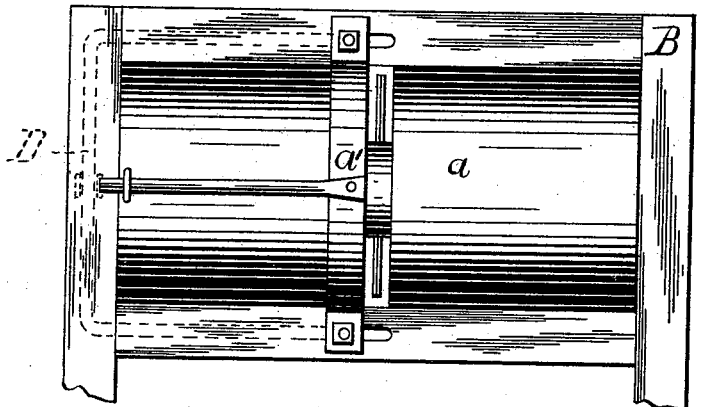
Figure 6:
Figure 7:

In the accompanying drawings, Figure 1 is a sectional elevation on the line x x, Fig. 4, showing the operative parts. Fig. 2 is a detail of the regulating-gate in the hopper. Fig. 3 is a side view of a portion of the device, showing the lever for the purpose of adjusting the discharge-opening, and also showing the attachment of a seat. Fig. 4 is a plan showing a portion of the cylinder and its teeth, the wheels, and the stationary teeth. Fig. 5 is a view of the bottom of the hopper, showing the distributing-opening in the semicircular bottom of the hopper, also the means whereby the discharging capacity of this opening is regulated. Fig. 6 shows a cutting-tooth in detail, somewhat enlarged. Fig. 7 is an enlarged view of one of the teeth in the main cylinder.

In the figures, like reference-marks indicating corresponding parts in the several views, A is the hopper, which is carried on the frame B, which frame is in turn carried on the wheels C. The said hopper A has a semicircular bottom, *a*, made of sheet-iron or other suitable material, which material either has a rectangular slot made in it or is made in two pieces and fastened to the bottom of the hopper in such a manner as to have an opening in its center for the discharge of fertilizer, as is best shown in Fig. 5. The capacity for the discharge of said opening is adjusted by means of the strap *a'*, which strap is operated, as fully shown in Figs. 1, 3, and 5, by means of the bail D, which passes from its place of connection to the strap *a'* upwardly through slots in the frame B, thence around the hopper A and under the guides *d*, (best shown in Fig. 3,) and connects with the lever E, by means of which lever the strap *a'* may be reciprocated, which strap, by covering more or less the opening in the semicircular bottom *a*, effectually regulates the discharge. The main spiked cylinder F forms the central part of the axle, the gudgeons and the spindles of said axle being formed from the spindle proper of a "stub end" of a vehicle-axle, one of which is inserted in each end of the cylinder F to complete the axle. These stub ends are preferably fastened therein by one or more of the spikes in the cylinder passing through them, which spike or spikes extend on the other side of the said cylinder sufficiently to form another spike. In the construction of this device all of the spikes may pass entirely through the cylinder and form corresponding spikes on the other side of said cylinder or not, as found most desirable and practicable. Instead of rigidly attaching the wheels, as is customary in this class of distributers, I prefer to leave one of them loose on the axle, or use one or more set-screws in the hub of each, so that in the latter case either one can be loosened at will, for the purpose in both cases of allowing the machine to be turned around at the end of the row or otherwise without having the spiked cylinder revolve, which will stop the operation of the machine until the machine is again started forward. This is accomplished in the following manner, viz: One wheel being tight on the axle and one being loose thereon, the machine can be turned around by swinging it on the tight wheel, as on a pivot, allowing the wheel loose on the axle to revolve, and as this is the only one that does revolve it follows that the axle will not revolve.

The knife-shaped teeth G are inserted in the front and back cross-pieces of the frame, with the cutting-edges set toward the approaching spikes as the machine is drawn forward—that is to say, with the forward row having their cutting-edges turned upwardly and the back row having them turned downwardly. As these knife-shaped teeth G are set in the center of the cross-pieces and the center of the cylinder F is in a lower position, opposite teeth on the cylinder will not pass the opposite teeth at the same time, by reason of which only sufficient power is required to operate the rows alternately and not both at one and the same time, which is readily seen to be a great reduction in motive power required to draw the machine.

As this class of fertilizer-distributers is ordinarily constructed, a mass of fertilizer accumulates in the bottom of the hopper and masses itself around the spiked cylinder. This is found by experience to be the result of the weight above and an excessive amount of material being fed downwardly. For this reason I insert the sliding gate H, which is capable of such adjustment as will allow only a necessary amount of fertilizer to descend to the cylinder, and will also prevent any undue pressure on the material that is in the bottom of the hopper. The teeth of the cylinder F will keep the opening left by the withdrawal of this gate clear of any obstructive accumulation. Said gate is also very convenient when it is desired to carry the load some distance before distributing. Holes, as shown in Fig. 2, are punched through this gate and the pin h inserted to hold it in position.

I supply the spiked cylinder I and the grating J when it is necessary to pulverize the fertilizer before it can enter the lower part of the hopper, which is not always though sometimes necessary.

If desired, the iron forming the guides d may be extended and form a means of attachment of the seat K, as shown in Figs. 1 and 3, although I do not confine myself to this specific manner of attachment, for the reason that there are many ways in which this attachment can be made that are equally effective and desirable.

Having thus fully described my invention, what I claim as new, and desire to secure by Letters Patent of the United States, is—

In a fertilizer-distributer, the combination of the hopper A, having a semicircular bottom, a, and a discharge-opening, the spiked roller F, the slide H, the spiked roller I, and the grating J, substantially as shown and described, and for the purpose specified.

In testimony whereof I affix my signature in presence of two witnesses.

A. J. BAUGH.

Witnesses:
A. P. WOOD,
L. N. RENWICK.